Patented Feb. 6, 1934

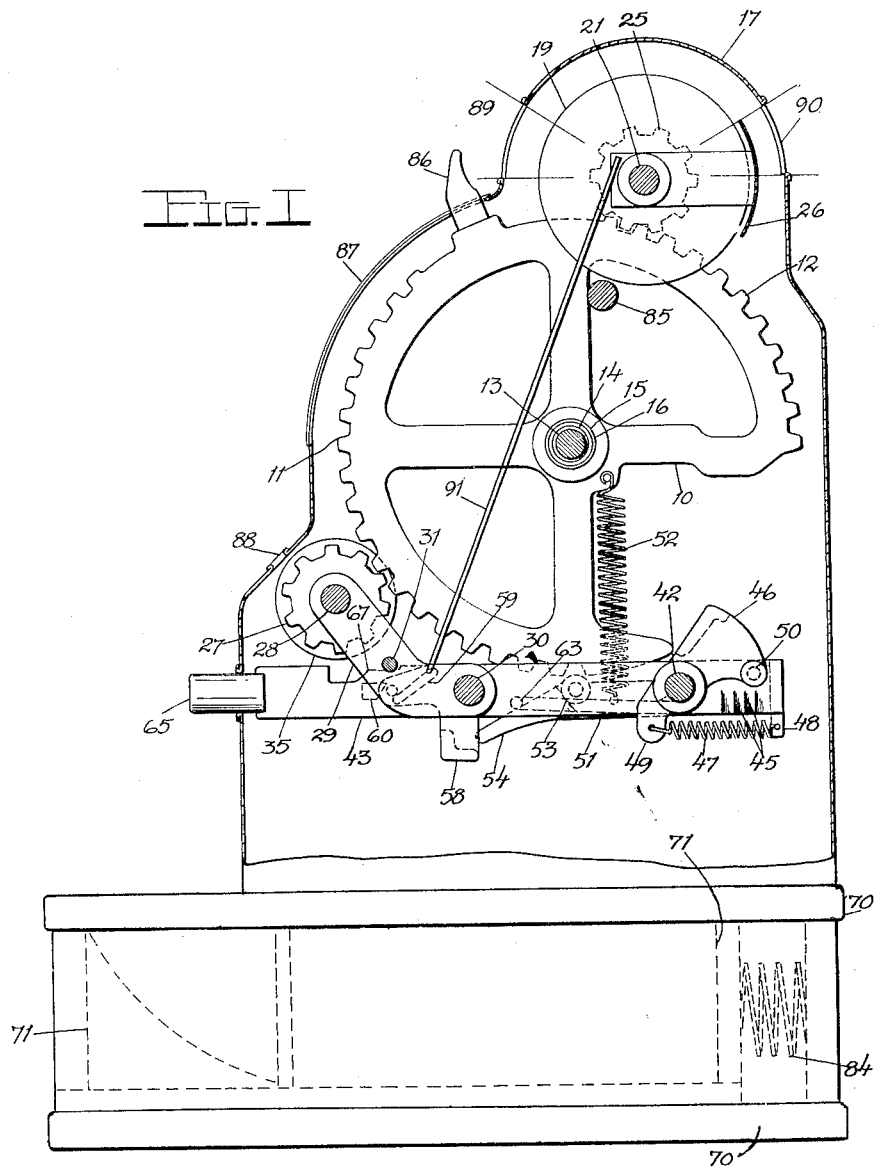

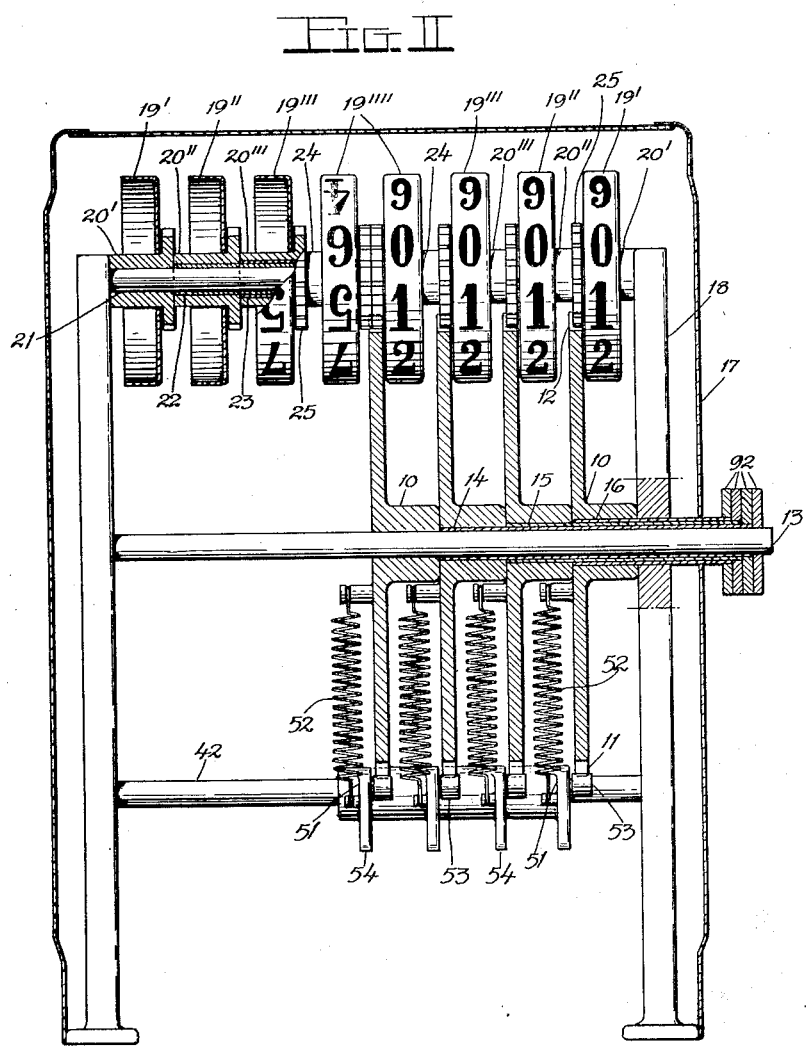

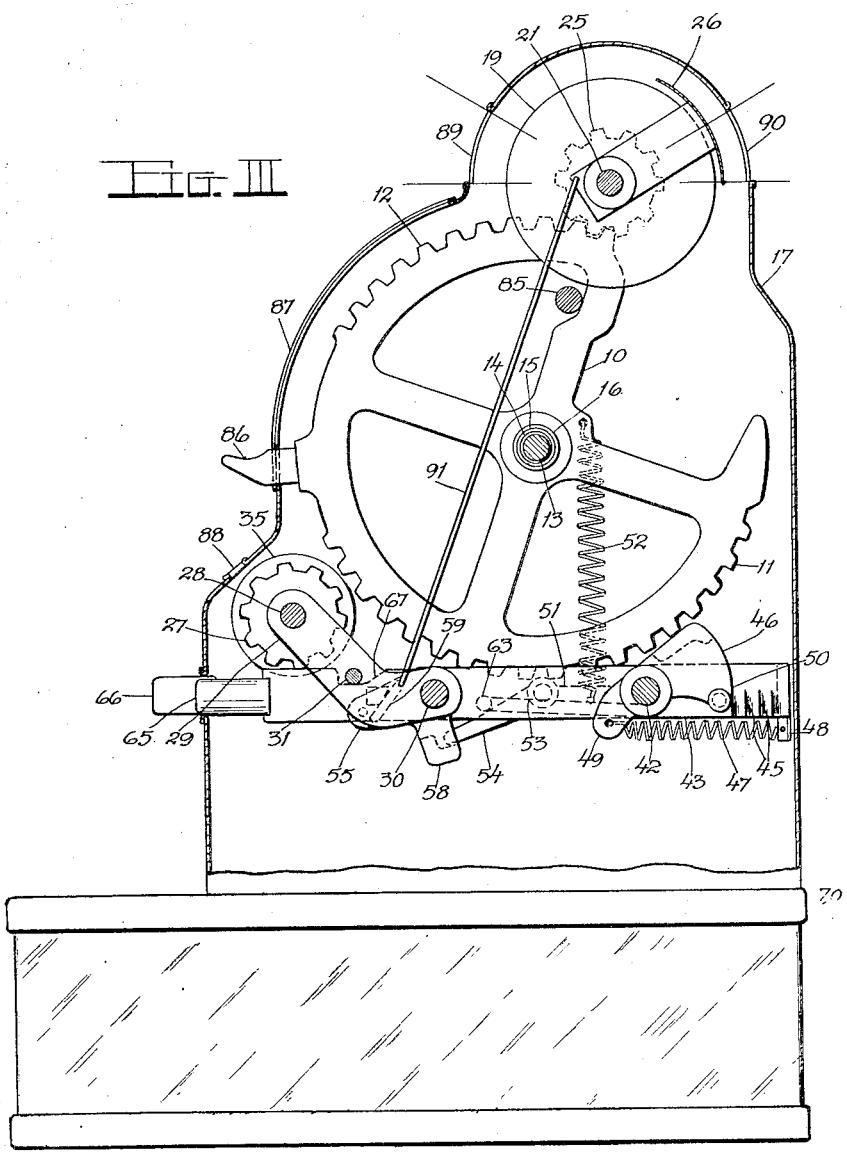

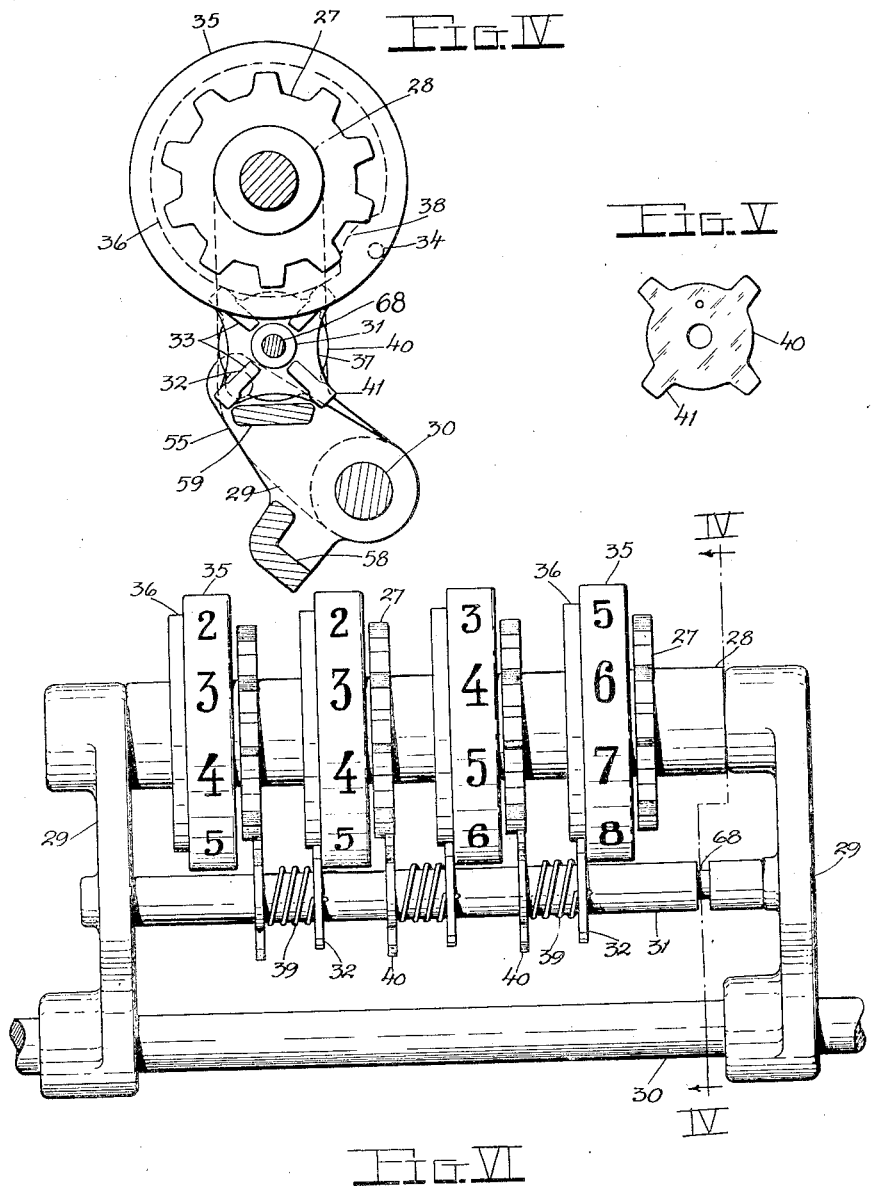

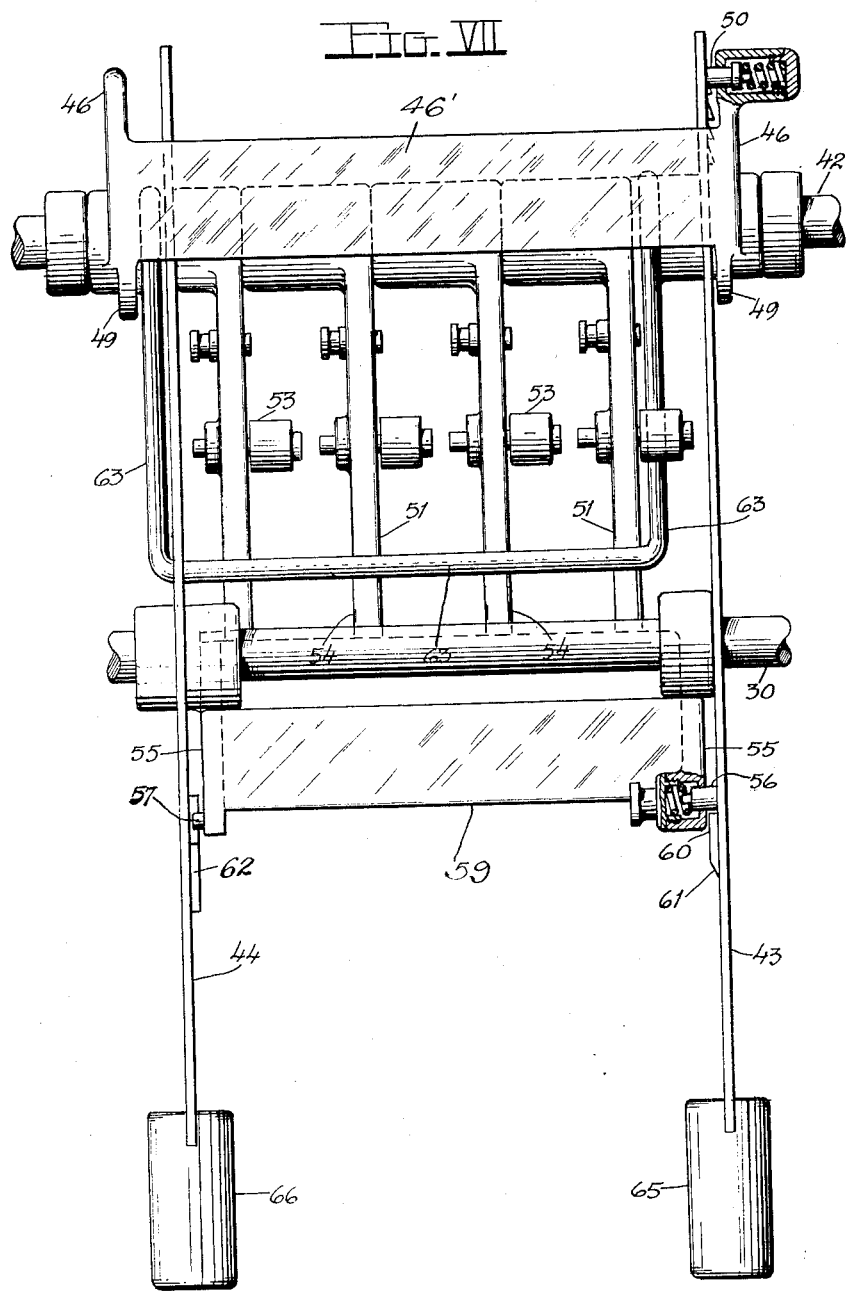

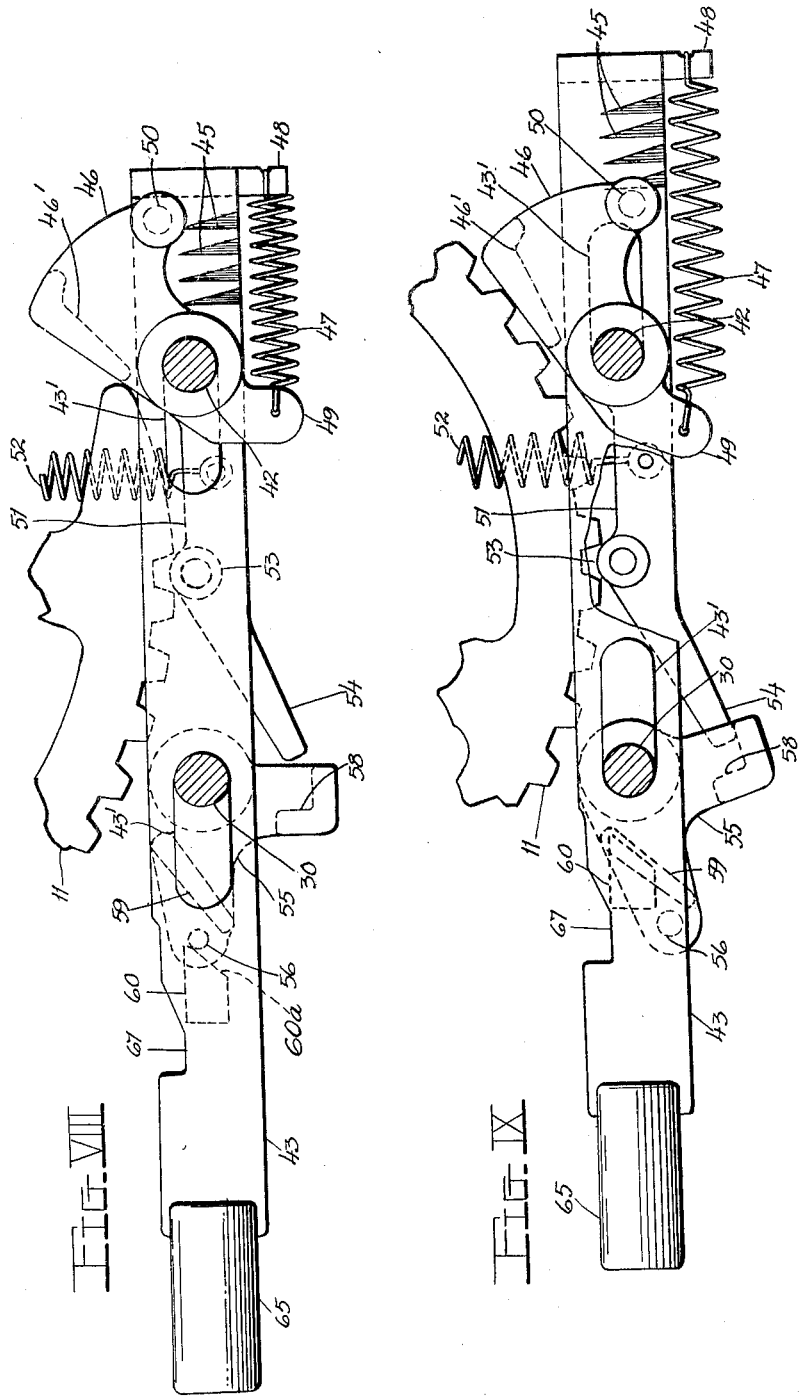

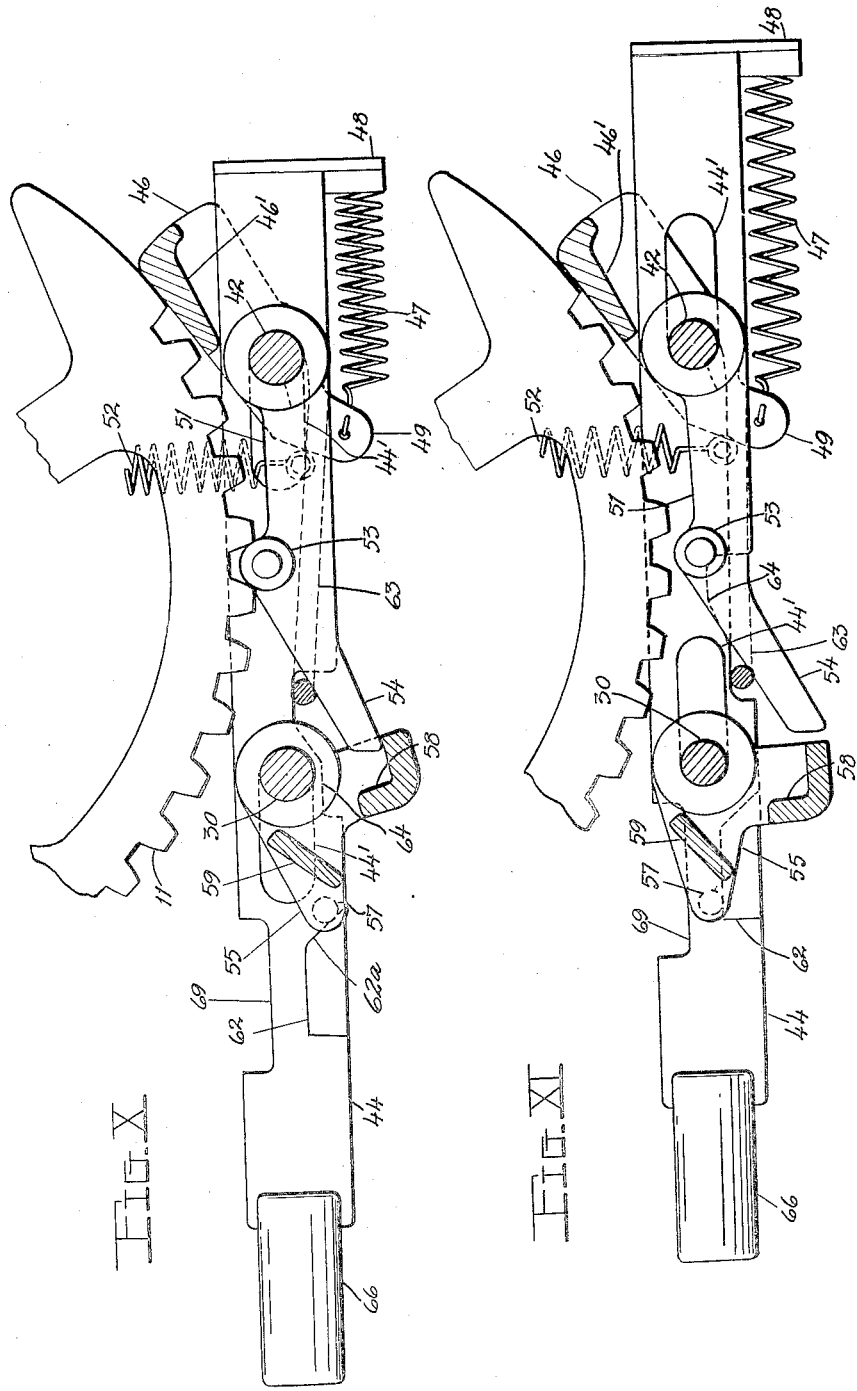

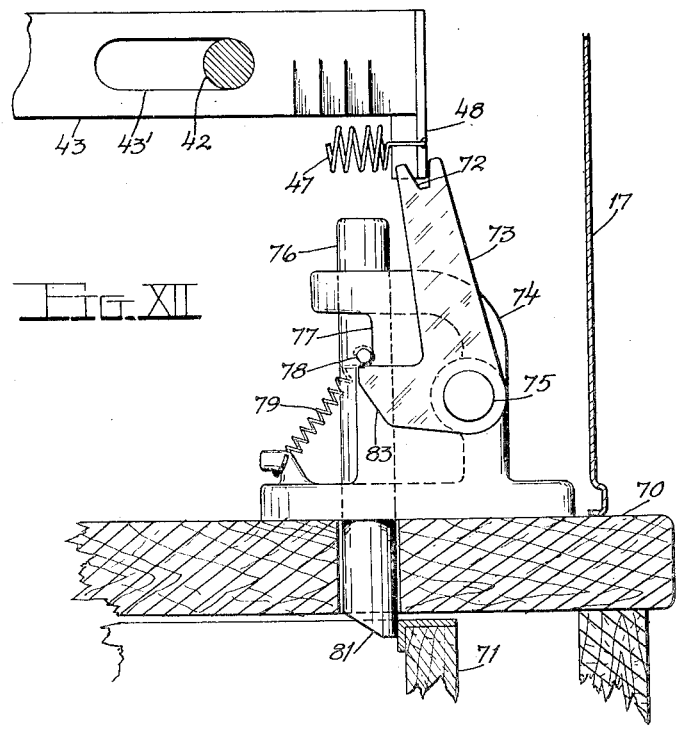
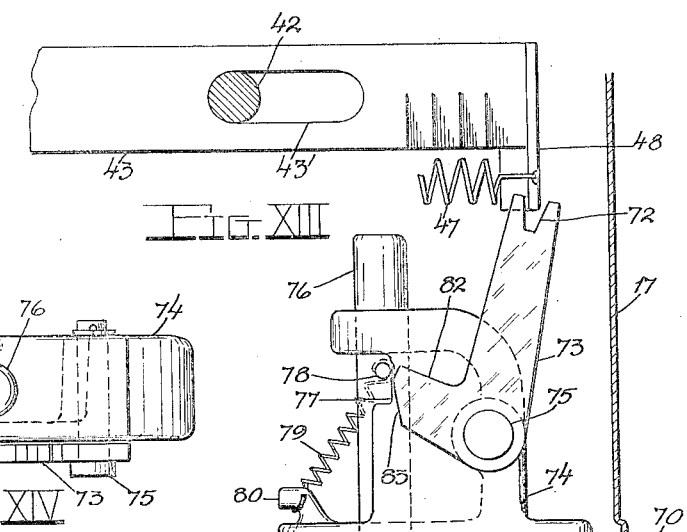
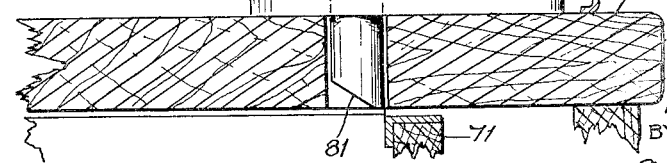

1,945,589

UNITED STATES PATENT OFFICE 1,945,589

CASH REGISTER

Tord Erik Daniel Bilde and Sten Eric Lindvall, Stockholm, Sweden

Application February 28, 1929, Serial No. 343,512, and in Sweden March 1, 1928

6 Claims. (Cl. 235—2)

Our invention relates to improvements in cash registers, and particularly in cash registers comprising totalizing, indicating and printing devices.

One object of the invention is to provide a cash register of simple construction and which is easy to operate.

Another object of the invention is to provide a cash register in which the set or set-up members set the totalizing, indicating and printing devices simultaneously.

Still another object of the invention is the provision of a cash register in which the setting members cooperate directly, that is, without the aid of intervening parts, with the totalizing, indicating and printing devices.

A further object of the invention is to provide a cash register in which, by means of setting the setting members, power is accumulated which is utilized for the further operation of the totalizing, indicating and printing devices, by which separate power producing members, such as motors, hand operated cranks, or the like, are made unnecessary.

A still further object of the invention is to provide a cash register in which, after a certain sum has been registered, the setting members must be restored to zero position before a new registration can be effected, in order to secure an effective check on the persons operating the register.

Still another object of the invention is to provide a cash register in which one and the same element is used for keeping the setting member in position during setting and for locking the same during registering and printing.

Further objects and novel features of the invention will be apparent from the following description taken in connection with the accompanying drawings which more or less diagrammatically illustrate a preferred embodiment of our invention.

In the accompanying drawings:

Fig. 1 is a side view in section of the register,

Fig. 2 is a fragmentary front view of the indicator, setting members and their catch members, Fig. 3 is a side view in section of the register with setting member and registering bar set for registration, Figs. 4, 5 and 6 are fragmentary views of the totalizer, Fig. 7 is a fragmentary plan of the catch members and locking devices for the setting members and of the registering and restoring bars, Figs. 8 and 9 show respectively the registering bar in its both positions, Figs. 10 and 11 show respectively the restoring bar in its both positions, Figs. 12, 13 and 14 show fragmentary views of the locking device for the cash drawer.

The main parts of the cash register are: item set-up mechanism, an indicator, a totalizer, a printer, blocking devices, catch members, locking devices, registering bar and restoring bar.

The item set-up mechanism comprises item set-up or setting members (Figs. 1, 2 and 3) consisting of wheels 10, each composed of two cogged portions or segments 11 and 12. One of the wheels 10 is fixed to a shaft 13 and the other wheels to bushings 14, 15 and 16 surrounding shaft 13. Shaft 13 is in turn rotatably supported in stationary side supporting plates 18 enclosed in a housing 17.

The indicator (Figs. 1, 2 and 3) consists in the embodiment illustrated of eight numeral discs 19', 19" etc. mounted on sleeves 20', 20" etc. Sleeves 20' etc. and discs 19' etc. are in turn mounted in pairs in the following manner: Disc 19' is mounted on sleeve 20' which, in turn, is mounted on shaft 21. Disc 19" is mounted on sleeve 20" which, in turn, is mounted on a bushing 22. Disc 19''' is mounted on sleeve 20''' which, in turn, is mounted on a bushing 24. Discs 19'''' are fixed together on a bushing 24. The bushings are loosely mounted on each other and on shaft 21. Shaft 21 is loosely mounted in supporting plates 18. Each of said sleeves is provided with a cogged collar 25 cooperating with segment 12 of wheels 10. On shaft 21 also a blinding device 26 is rotatably mounted for shutting off the view of the indicator from the side opposite the operating side.

The totalizer (Figs. 1, 3, 4, 5 and 6) consists, in the embodiment shown of four cog or gear wheels 27 rotatably mounted on a shaft 28, the latter being secured to two arms 29 comprising a movable frame in turn rotatably mounted on a further shaft 30 rigidly secured to side plates 18. On a shaft 31, which also is secured to arms 29, discs 32 are rotatably arranged. Discs 32 are provided with notches 33 which cooperate with pins 34 on the numeral wheels 35. Each gear wheel 27 is rigidly connected to the adjacent numeral wheel 35. The groups of wheels 27 and 35 so connected have relative rotary movement on shaft 28. Wheels 35 are each provided with a circular sliding surface 36 against which concave curves 37 on discs 32 may slide. Member 36 is also provided with a recess 38 opposite pin 34. To disc 32 one end of a spiral spring 39 surrounding shaft 31 is fixed, the other end of which is secured to a carrier or tens transfer disc 40. Carrier 40, the shape of which will be evident from Fig. 5, is also rotatably arranged on shaft 31 and is at its periphery provided with four projections 41 which under certain circumstances will cooperate with the cogs of cog wheels 27.

Members 18 support not only shafts 13, 21 and 30 but also shaft 42 and rod 85. On shafts 30 and 42, bars 43 and 44 are slidably arranged at right angles to said shafts. For this purpose, bars 43 and 44 are provided with oblong holes or slots 43' and 44'. Bar 43 (registering bar) is provided at its right end (Figs. 8 and 9) with inclined projections 45. On shaft 42, locking members 46 are rotatably arranged, whereby a bar 46' connecting members 46 may slide against segments 11 of setting wheels 10, under which circumstances members 46 will be forced to rotate against the load of springs 47 fixed between projections 48 of bars 43 and 44, and projections 49 of members 46. One of the members 46 (the right one in Fig. 7) is further provided with a spring loaded pin 50 which is enabled to slide over projections 45 and to lock bar 43 in the position as shown in Fig. 9.

On shaft 42, catch members 51 are rotatably arranged. Springs 52 draw rollers 53 on members 51 against segments 11 of setting wheels 10. The stress of spring 52 must be strong enough to keep setting wheels 10 in every desired position, that is, in the position of any item set up, by means of rolls 53 engaging cogs of segments 11. Catch members 51 are each formed with a nose 54.

On shaft 30, two members 55 are rotatably mounted. Members 55 are provided with pins 56 and 57 of which pin 56 is spring loaded. Two bars 58 and 59 connect members 55 with each other rigidly. Bar 58 is L-shaped and has for its object to pass under noses 54 and thus to lock catch members 51 and wheels 10 in desired positions. Bar 59, however, is plane and has for its object to lie against carrier discs 40 and thus to prevent rotation of the same when such rotation is not desired. When bar 43 slides on shafts 30 and 42, pin 56 will cooperate with and slide along the inclined rear edge 60a and bottom of a projecting member 60 mounted on bar 43, the forward end of which (left hand end in Figs. 8 and 9) is beveled as at 61 (Fig. 7). On movement of bar 44, pin 57 will slide along the inclined right edge 62a and upper edge (Figs. 10 and 11) of a projecting member 62 on bar 44 whereby bar 58 is moved out of engagement with noses 54. On shaft 42 a bow or bail 63 is rotatably mounted which lies against the upper edges of noses 54. On the movement of bar 44, bow 63 will slide against an inclined surface 64 arranged on the under side of said bar, and thus after bar 58 has come out of engagement with noses 54, depress said noses, whereby catch members 51 will release wheels 10. The outer ends of bars 43 and 44 are provided with handles 65 and 66.

On the upper side of bar 43 a recess 67 is provided having an inclined rear edge. A contraction 68 of shaft 31 will slide along this inclined edge into recess 67 when bar 43 is moved inwards. The totalizer can thus come out of engagement with setting wheels 10, a recess 69 being also formed in bar 44 for this purpose.

Housing 17 is mounted on a wooden stand 70 (Figs. 12, 13 and 14) in which the cash drawer 71 is arranged. Projection 48 on bar 43 engages a notch 72 in a bell-crank 73 rotatably mounted on a stand 74 by means of a bolt 75. A locking member 76 is slidably and rotatably arranged in stand 74. The sliding movement of member 76 is limited by means of a spur 77 in stand 74, in which a pin 78 extending through member 76 is adapted to slide. A spring 79 is mounted at one end on the end of pin 78 opposite the end which cooperates with lever 73, and at its other end on a projection 80 of stand 74. Member 76 is sloped as at 81. The short arm 82 of lever 73 is sloped as at 83. Between the back-wall of stand 70 and cash drawer 71 springs 84 are arranged (Fig. 1).

The movement of setting wheels 10 is limited by a rod 85. Setting wheels 10 are provided with handle grips or keys 86 which protrude through the frontwall of housing 17 and may be moved into positions corresponding to the numerals to be registered. These numerals are marked on numeral bands 87. Sight openings 88, 89 and 90 are provided for the numerals on wheels 35 and 19 respectively.

The blinding device 26 is operated by means of a rod 91 connected with one of the arms 29.

On the ends of shaft 13 and bushings 14, 15 and 16 printing wheels 92 are indicated.

The cash register is operated and works in the following manner:

By means of handle grips 86 setting wheels 10 are turned into positions corresponding to the numerals to be registered. At the same time as wheels 10 are turned, a corresponding line of numerals will be set on wheels 19, 35 and 92 by means of cog wheels 25, 27 and shaft 13 and bushings 14, 15 and 16 respectively. When wheels 10 are turned, rollers 53 of catch members 51 will snap over the cogs of segment 11 and will, when the numerals desired have been set, keep wheels 10 in this position due to the stresses of springs 52. At the same time, the right end of blocking member 46' is forced downwards by segment 11 against the stress of springs 47, and the spring loaded pin 50 will slide onto projections 45.

The operations so far described constitute item setting manipulation. Up to this point, the setting wheels 10 have not been locked in item set-up position, but only retained in such position by rollers 53, and hence if an error has been made it may be corrected by moving the setting wheels 10 either forward or backward to the correct number, or the wheels 10 may be returned to their original no item set-up position. This will not cause an incorrect result to be registered on the totalizer, inasmuch as the gear wheels 27 of the totalizer have been in mesh with wheels 10, and may be turned in either direction by wheels 10, whereby any mistakes originally made will be corrected on the totalizer at the same time at which they are corrected on the setting wheels 10. The same is true of the indicator.

When the items have been correctly set up, handle 65 is pushed inwards by the operator. On this movement of bar 43, pin 56 will slide against the inclined right edge 60a (as seen in Fig. 9) of projection 60 whereby member 55 is caused to rotate around shaft 30 and the L-shaped bar 58 to move under noses 54, by means of which setting wheels 10 are locked in their respective positions by catch members 51. At the same time, shaft 31 will slide along the inclined rear edge into recess 67 whereby the whole totalizer is lowered due to gravity and its cog wheels 27 come out of engagement with segments 11 of setting wheels 10. When the totalizer is lowered in the manner described, blinding device 26 is opened because, as already mentioned, the same is connected to arm 29 of the totalizer by means of rod 91, and the customer is enabled to read the sum to be paid on the indicator through sight opening 90. On further rearward movement of bar 43, as above mentioned, bell-crank 73 is influenced by projection 48 and turned in clockwise direction, as seen in Fig. 12, whereby arm 82, the end of which lies against pin 78, lifts member 76, as a result of which cash drawer 71 is unlocked and pushed outwards by means of spring 84. Due to the stress of spring 79, member 76 is again pulled downwards which is made possible on account of the pin 78 being passed by the end of arm 82, as will appear from Fig. 13. Bar 43 itself is locked in the position shown in Fig. 9 by virtue of projections 45 over which the spring loaded pin 50 slides during inward movement of said bar. All parts will now remain in this position until further operation.

After cash drawer 71 has been closed again, bar 44 which is in the position as shown in Fig. 10, is pushed inwards and is thereby guided by shafts 30 and 42 to the position shown by Fig. 11. On this movement of bar 44, pin 57 will first slide up on and along the edge of projecting member 62, whereby member 55 is turned in clockwise direction and thus bar 58 brought out of engagement with noses 54 which now are unlocked. On further movement, bow 63 will slide along the inclined surface 64 and depress noses 54 and thus release wheels 10 from engagement with rollers 53 on catch members 51. Due to the stresses of springs 52, wheels 10 will be turned in clockwise direction and resume their zero positions. When this takes place, the setting wheels 11 are moved forwardly of bar 46' and the whole member 46—46' is returned to the position shown in Fig. 8. This removes the spring-pressed pawl 50 from the range of travel of projections 45 so that bar 43 is released for forward movement. The outward movement of bar 43 is made possible by means of the spring loaded pin 56 sliding up on the inclined surface 61 and over projection 60. Thus bar 43 moves outwardly, that is, forwardly toward the operator, due to spring 47. On the outward movement of bar 43, projection 48 will turn bell crank lever 73 in anti-clockwise direction and the inclined surface 83 of arm 82 slides along pin 78 whereby member 76 is turned in clockwise direction against the stress of spring 79 (as seen in Fig. 14), thus enabling the nose of arm 82 to move past pin 78 and again assume the position as shown by Fig. 12. Shaft 31 will, on this movement of bar 43, slide up on curve 67 and raise the totalizer and thus bring the same again into engagement with the cogs of segments 11, whereby also blinding device 26 is shut and the numeral wheels 19 are brought back into their previous position. At the end of the rotation of wheels 10, member 46 will due to the stress of springs 47 be raised and pin 50 will thereby come out of engagement with projections 45 due to which bar 43 will be forced to take in its previous position, which also is the case with the bar 44.

After the desired sum now has been registered and possibly been printed by means of printing wheels 92, the cash register is ready for the next operation.

If the numeral wheel 35 furthest to the right in Fig. 6 due to influence by segment 11 on cog wheel 27 has passed from zero to nine and is moved one step further to zero again, pin 34 enters one of the notches 33 in disc 32 and turns said disc a quarter of a revolution. This is made possible on account of recess 38 formed in sliding surface 36. After disc 32 has been turned and spring 39 thereby has been stressed, the concave edge 37 next to the first of disc 32 will slide against sliding surface 36 when it is turned further. Spring 39 is unable to turn disc 40 as this is blocked by bar 59 and can neither be rotated by cog wheel 27 second to the right. When, however, registering bar 43 is pushed inwards, member 55 rotated by projection 60 and the whole totalizer arrangement lowered, disc 40 will become free from bar 59 and spring 39 will due to its stress received from rotation of disc 32 force disc 40 to rotate a quarter of a revolution in anti-clockwise direction, whereby projection 41 engages with one of the cogs of cog wheel 27 and turns the same one step. In this way the ten-transfer between the numeral wheels 35 is effected.

What we claim is:—

1. In a cash register, set-up mechanism comprising a plurality of set-up members, spring actuated means for returning each set-up member to zero position, a spring actuated catch member for each set-up member, a releasable locking member common to all said catch members, a bar for operating said locking member and locking means actuated by any one of said set-up members for securing said bar in locked position.

2. In a cash register, set-up mechanism comprising a plurality of set-up members, spring actuated means for returning each set-up member to zero position, a spring actuated catch member for each set-up member, a releasable locking member common for all said catch members, a bar for operating said locking member, locking means actuated by any one of said set-up members for securing said bar in locked position and releasing means for releasing said locking member.

3. In a cash register, set-up mechanism comprising a plurality of manually rotatable set-up members, reaction means for returning each set-up member to zero position, a spring actuated catch member for retaining each set-up member in set-up position, a totalizing mechanism comprising a movable frame, a plurality of totalizing wheels rotatably mounted on said movable frame and arranged to be rotated by said set-up members, and a bar for locking said catch members and for disengaging said totalizing wheels from rotational engagement with said set-up members.

4. In a cash register, set-up mechanism comprising a plurality of manually rotatable set-up members, reaction means for returning each set-up member to zero position, a spring actuated catch member for retaining each set-up member in set-up position, a totalizing mechanism comprising a movable frame, a plurality of totalizing wheels rotatably mounted on said movable frame and arranged to be rotated by said set-up members, a first bar for locking said catch members and for disengaging said totalizing wheels from rotatable engagement with said set-up members and a second bar for disengaging said catch members from said set-up members.

5. In a cash register, set-up mechanism comprising a plurality of manually rotatable set-up members, reaction means for returning each set-up member to zero position, locking means arranged to be moved to locking position by the rotation of any one of said set-up members from zero position, a spring actuated catch member for retaining each set-up member in a desired position, a totalizing mechanism comprising a movable frame, a plurality of totalizing wheels rotatably mounted on said movable frame and arranged to be rotated by said set-up members, and a bar for locking said catch members in engagement with said set-up members and for disengaging said totalizing wheels from rotational engagement with said set-up members, said locking means serving to lock said bar.

6. In a cash register, set-up mechanism comprising a plurality of manually rotatable set-up members, reaction means for returning each set-up member to zero position, locking means arranged to be moved to locking position by the rotation of any one of said set-up members from zero position, a spring actuated catch member for retaining each set-up member in a desired position, a totalizing mechanism comprising a movable frame, a plurality of totalizing wheels rotatably mounted on said movable frame and arranged to be rotated by said set-up members, a first bar for locking said catch members in engagement with said set-up members and for disengaging said totalizing wheels from rotational engagement with said set-up members, said locking means serving to lock said bar and a second bar for disengaging said catch members from said set-up members whereby the set-up members are returned to zero position by said reaction means and said locking means unlocks said bar and said totalizing wheels are again brought into engagement with said set-up members.

TORD ERIK DANIEL BILDE.
STEN ERIC LINDVALL.